Figure 1:
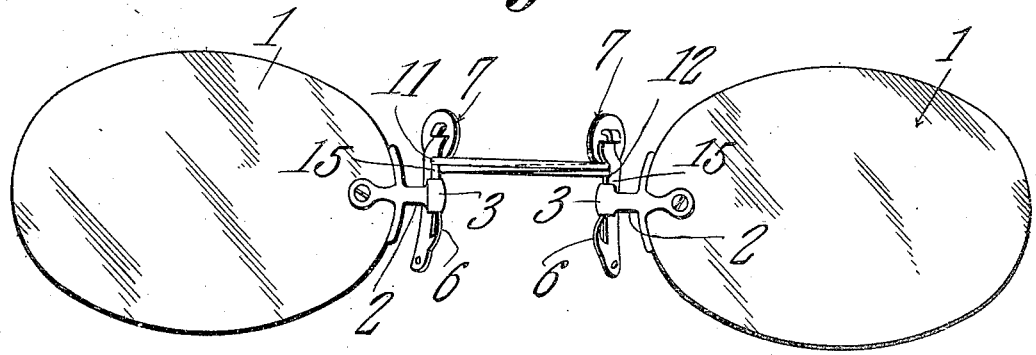

A. E. DOBLE.
EYEGLASS SPRING.
APPLICATION FILED JAN. 18, 1910.

958,236.

Patented May 17, 1910.

Witnesses

Inventor
Albert E. Doble.
By
Attorneys

UNITED STATES PATENT OFFICE.

ALBERT E. DOBLE, OF SCRANTON, PENNSYLVANIA.

EYEGLASS-SPRING.

958,236.

Specification of Letters Patent.   Patented May 17, 1910.

Application filed January 18, 1910.   Serial No. 538,738.

*To all whom it may concern:*

Be it known that I, ALBERT E. DOBLE, a citizen of the United States, residing at Scranton, in the county of Lackawanna and State of Pennsylvania, have invented a new and useful Eyeglass-Spring, of which the following is a specification.

It is the object of this invention to provide, in a simple, merchantable, and inexpensive form, a spring for eye glass frames, the construction of the spring being such that it will hold the lenses in a common plane and properly positioned with respect to their optical centers, without rendering the adjustment of the device upon the nose of the wearer, difficult, or creating a structure which will attract attention by reason of peculiarities of construction.

Another object of the invention is to provide an eye glass spring so constructed that it may be touched at a sensitive point during the application of the eye glass frame to the nose of the wearer, thereby temporarily decreasing the tension of the spring and diminishing the strain upon the lenses.

Another object of the invention is to provide a spring for eye glass frames so constructed that it shall embody at once, the degree of resiliency and the required rigidity which an article of that type should possess.

With the above and other objects in view, the invention consists in the novel construction and arrangement of parts hereinafter described, illustrated in the drawings, and claimed, it being understood that changes, properly falling within the scope of what is claimed, may be made, without departing from the spirit of the invention.

Similar numerals of reference are employed to denote corresponding parts throughout the several figures of the drawings.

Figure 2:
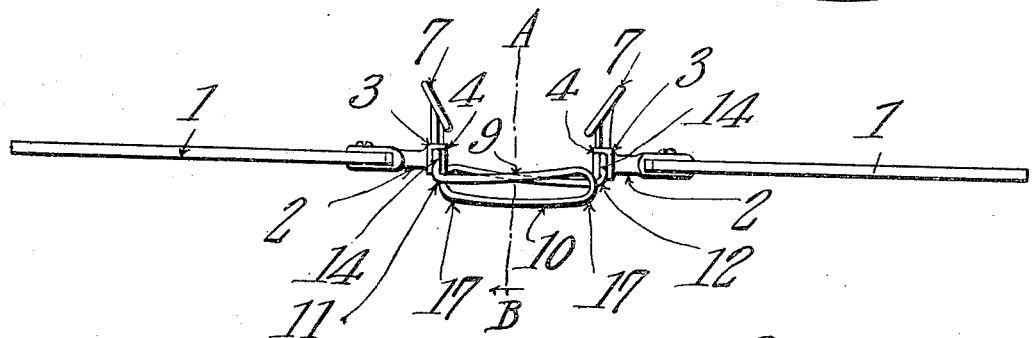
Figure 3:
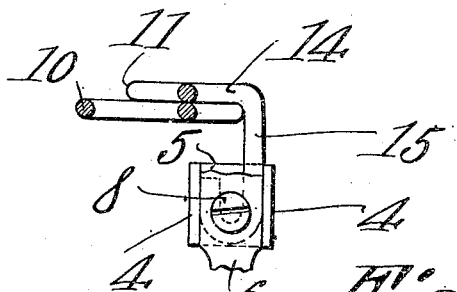
Figure 4:
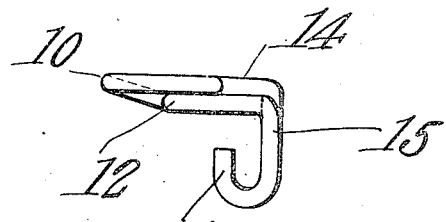

In the accompanying drawings,—Figure 1 shows the invention in front elevation, embodied in an eye glass frame structure; Fig. 2 is a top plan of the showing of Fig. 1; Fig. 3 is a transverse section upon the line A—B of Fig. 2; and Fig. 4 is an end elevation of the spring proper, disconnected from the frame proper, with which it is commonly assembled.

In the drawings, the lenses of the eye glasses are denoted by the numeral 1. These lenses are mounted in the usual manner, in lens-posts 2, which, at their adjacent ends, are provided with heads 3, usually formed integrally with the lens-posts.

As shown most clearly in Fig. 3 of the drawings, and as clearly discernible in Fig. 2, wings 4 outstand from the edges of the adjacent end faces of the heads 3, to define channels 5. Into these channels are inserted the arms 6 of the nose clips 7, the construction being such that the arms 6 fit closely between the wings 4, the arms being retained in place by means of screws 8, commonly extended through the arms 6 into engagement with the heads 3. Between the arms 6 and the heads 3, the ends of the eye glass spring, hereinafter described, are securely clamped.

The eye glass spring is fashioned from a single piece of material, having its ends crossed as denoted by the numeral 9 in Fig. 2, adjacent the face of the wearer, to form a loop 10 disposed in a plane substantially at right angles to the lens plane of the eye glass frame. One end 11 of the spring is extended laterally to cross one end of the loop 10 upon the top of the loop, and in contact therewith, while the other end 12 of the spring is laterally extended beneath the loop 10 to cross the opposite end of the said loop, in contact therewith, the ends 11 and 12 being thus extended in opposite directions, to cross opposite ends of the loop 10, within the contour of the loop, and in contact therewith.

Beyond the ends of the loop 10, the spring is rectangularly bent to form arms 14, standing substantially normal to the lens plane of the frame. The extremities of the arms 14 are downwardly bent, to form fingers 15, disposed in a plane substantially parallel with the lens plane, and terminating in hooks 16. These hooks 16 are of sufficient width so that they will register closely between the wings 4 of the heads 3, the hooks 16 being clamped between the arms 6 and the heads 3, by means of the screws 8.

Owing to the fact that the spring, between the lenses 1 is disposed in a plane at right angles to the plane of the lenses, the spring, although thoroughly effective to give the required resiliency, will be disposed in compact form, and so positioned that it will be inconspicuous. It should, moreover, be noted, that, at the front of the structure, the terminal portions 17 of the loop 10 outstand beyond the ends 11 and 12. By this construction, when the operator is placing the glasses upon his nose, the extremities of the second fingers may be brought to bear against the loop 10 at the points 17, thereby preventing the lenses 1 from bearing all of the strain incident to separating the nose clips 7 sufficiently to clear the nose of the wearer. The ends 11 and 12, bearing against the ends of the loop 10, tend to reinforce the structure. By crossing the ends of the loop 10 at 9, the spring may be partially housed between the lenses, thus rendering the spring less conspicuous, the angle formed at 9 permitting the lenses to be disposed close to the eyes of the wearer.

It should be noted that the spring of my invention, is of such a construction, that its least resistance is in a plane substantially at right angles to the lens plane of the frame, the spring therefore acting at right angles to the lens plane, and not parallel thereto, in engaging the nose of the wearer. By this construction, a more firm hold is secured, than is possible in the common constructions, in which the spring acts parallel to the lens plane of the frame. Moreover, owing to the fact that the spring consists of superposed parts in contact with each other, the construction of the device is such that the spring must, of necessity, exercise its holding function in a plane substantially at right angles to the lens plane.

Having thus described the invention, what is claimed is:—

1. An eye glass spring fashioned from a single piece of material having its ends crossed to form a loop and extended in opposite directions toward opposite ends of the loop.

2. An eye glass spring fashioned from a single piece of material having its ends crossed to form a loop and extended in opposite directions to cross opposite ends of the loop within the contour of the loop.

3. In an eye glass frame consisting of separate lens-holding members, a spring connecting the members and fashioned from a single piece of material having its ends crossed to form a loop disposed in a plane substantially at right angles to the lens plane of the frame and extended in opposite directions toward opposite ends of the loop.

4. In an eye glass frame consisting of separate lens-holding members, a spring connecting the members and fashioned from a single piece of material having its ends crossed to form a loop disposed in a plane substantially at right angles to the lens plane of the frame and extended in opposite directions to cross opposite ends of the loop within the contour of the loop.

In testimony that I claim the foregoing as my own, I have hereto affixed my signature in the presence of two witnesses.

ALBERT E. DOBLE.

Witnesses:
ALBERT L. WATSON,
J. R. GAVIN.